March 16, 1954  D. B. DOOLITTLE ET AL  2,672,306
FLYWHEEL TYPE CATAPULT LAUNCHING MEANS
Filed Jan. 5, 1951  9 Sheets-Sheet 1
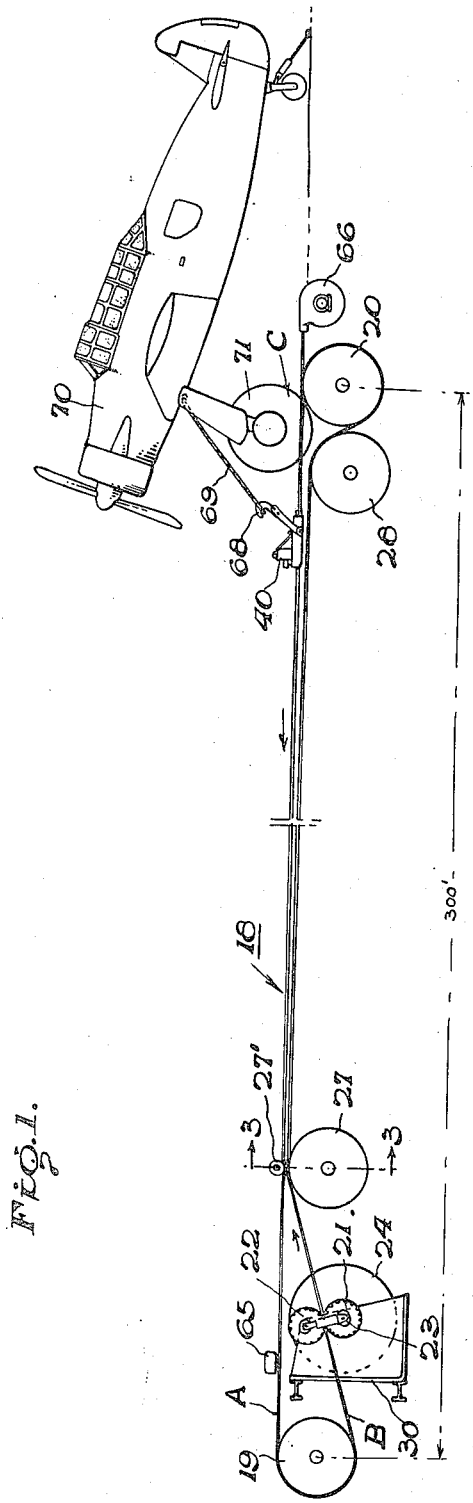
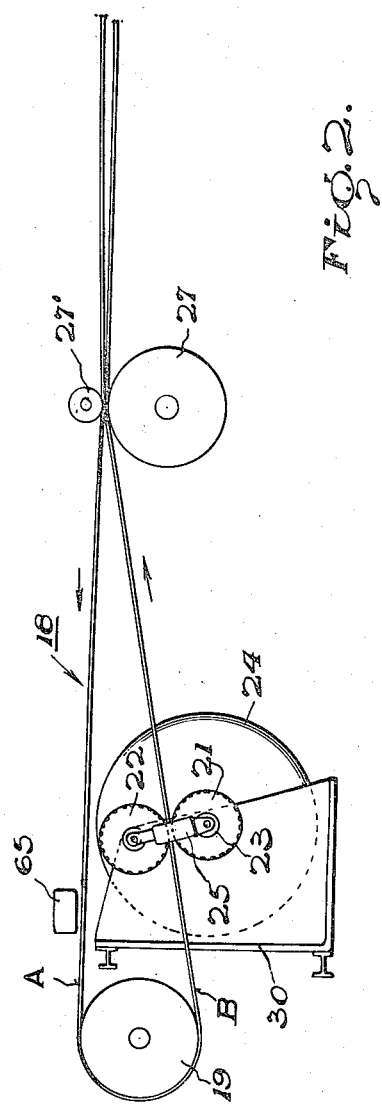
INVENTORS
Donald B. Doolittle
Raymond B. Janney II.
BY Herbert M. Birch
ATTORNEY March 16, 1954  D. B. DOOLITTLE ET AL  2,672,306
FLYWHEEL TYPE CATAPULT LAUNCHING MEANS
Filed Jan. 5, 1951  9 Sheets-Sheet 2
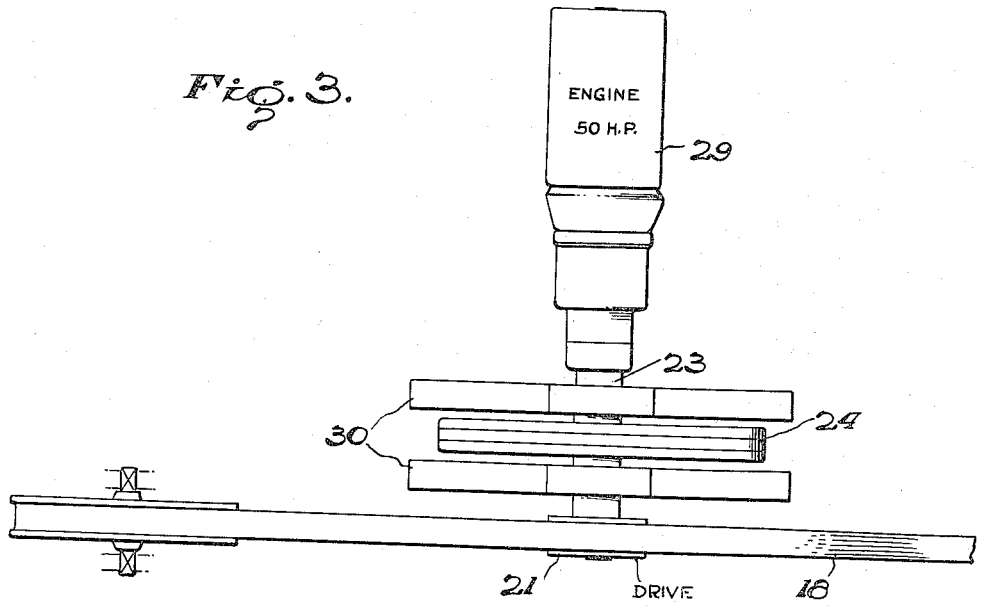
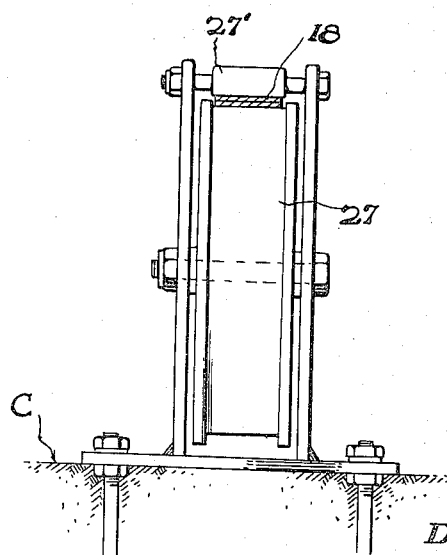
INVENTORS
Donald P. Doolittle
Raymond B. Janney II.
BY Herbert M. Birch
ATTORNEY March 16, 1954
D. B. DOOLITTLE ET AL
2,672,306
FLYWHEEL TYPE CATAPULT LAUNCHING MEANS
Filed Jan. 5, 1951
9 Sheets-Sheet 3
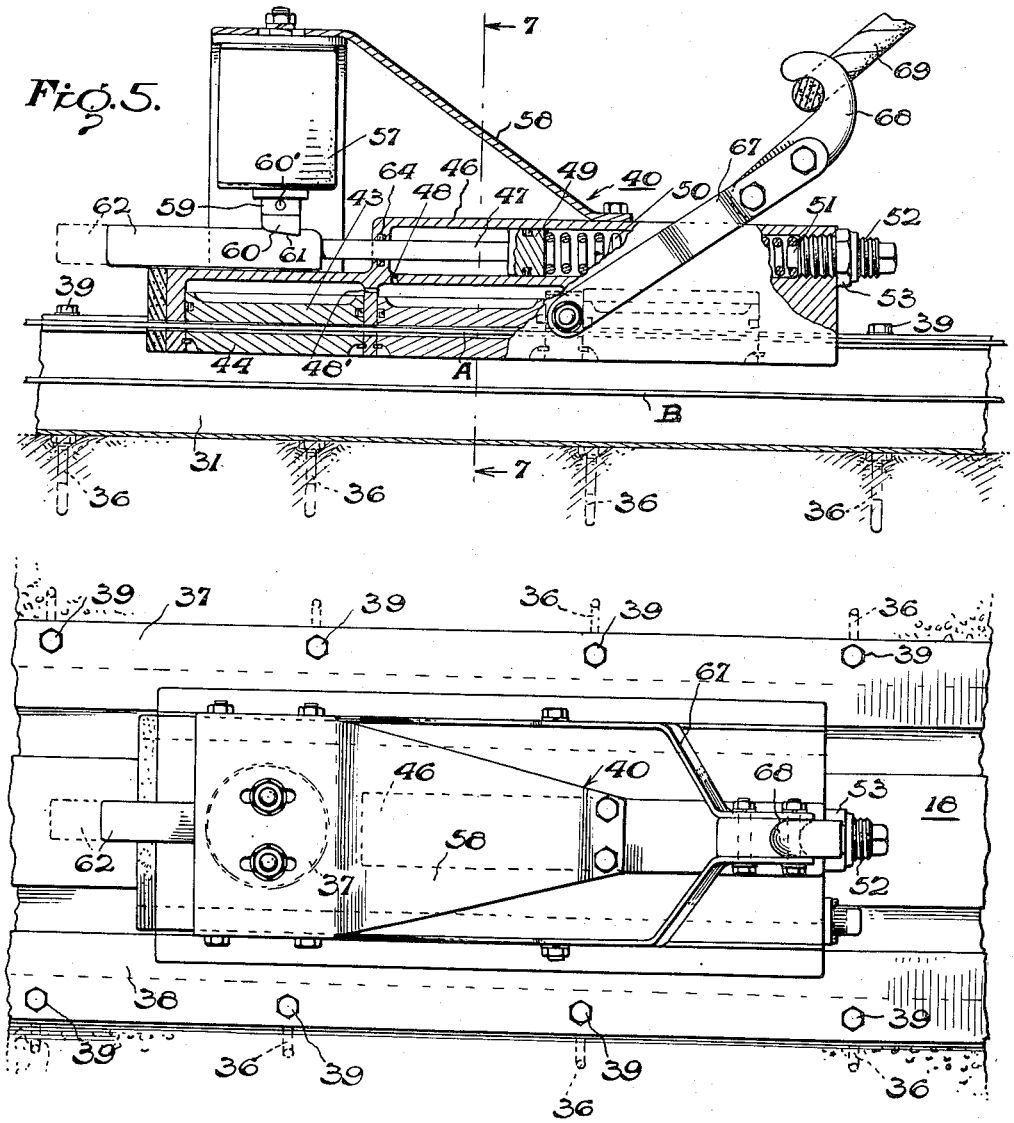
INVENTORS
Donald B Doolittle
Raymond B. Janney II.
BY Herbert M. Birch
ATTORNEY March 16, 1954  D. B. DOOLITTLE ET AL  2,672,306
FLYWHEEL TYPE CATAPULT LAUNCHING MEANS
Filed Jan. 5, 1951  9 Sheets-Sheet 4
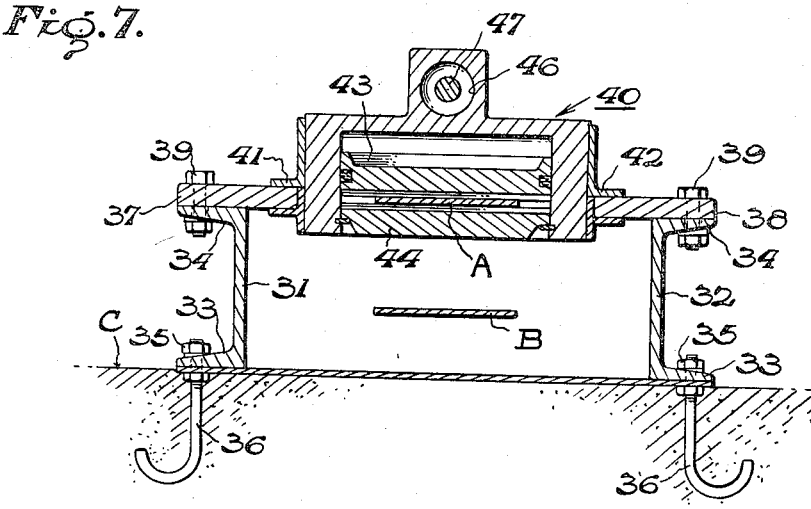
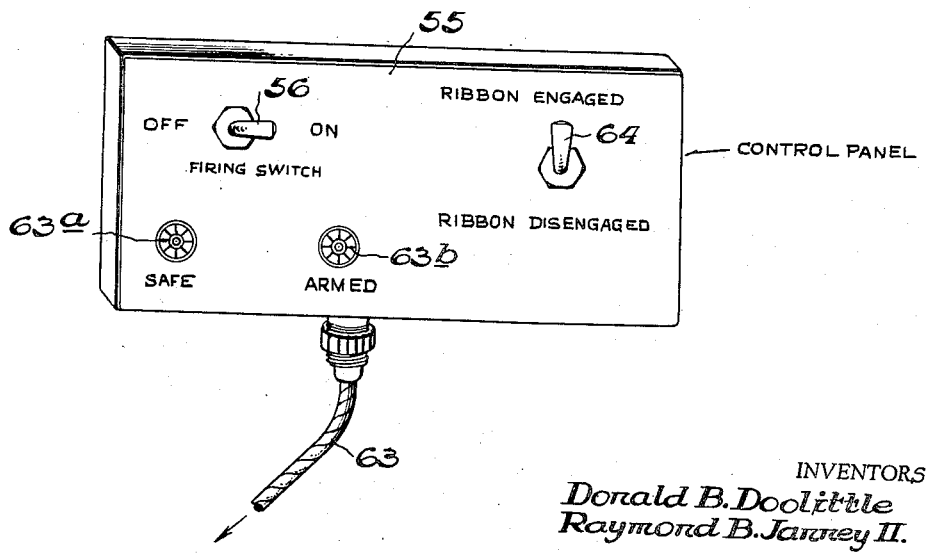
INVENTORS
Donald B. Doolittle
Raymond B. Janney II.
BY Herbert M. Birch
ATTORNEY

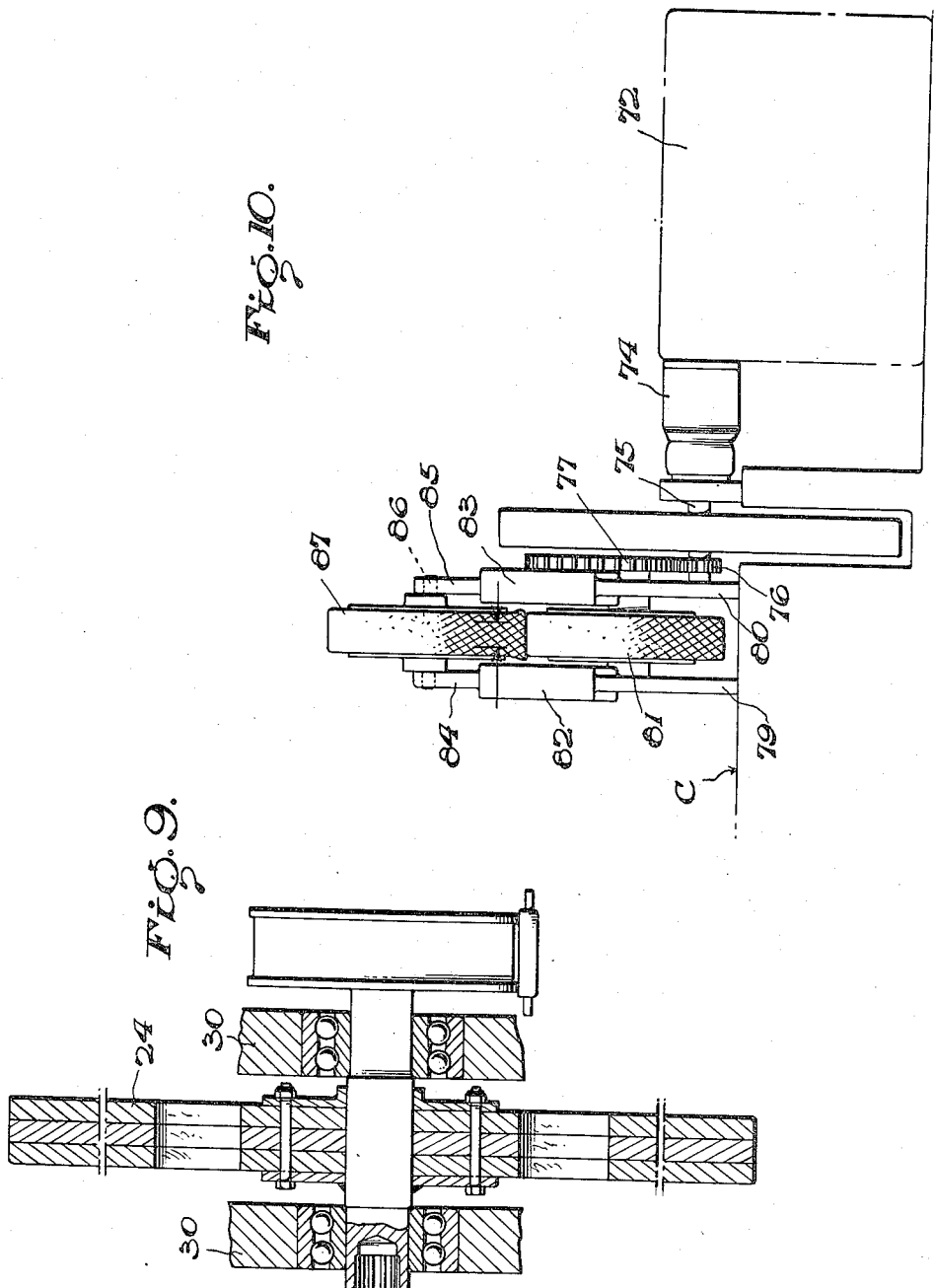

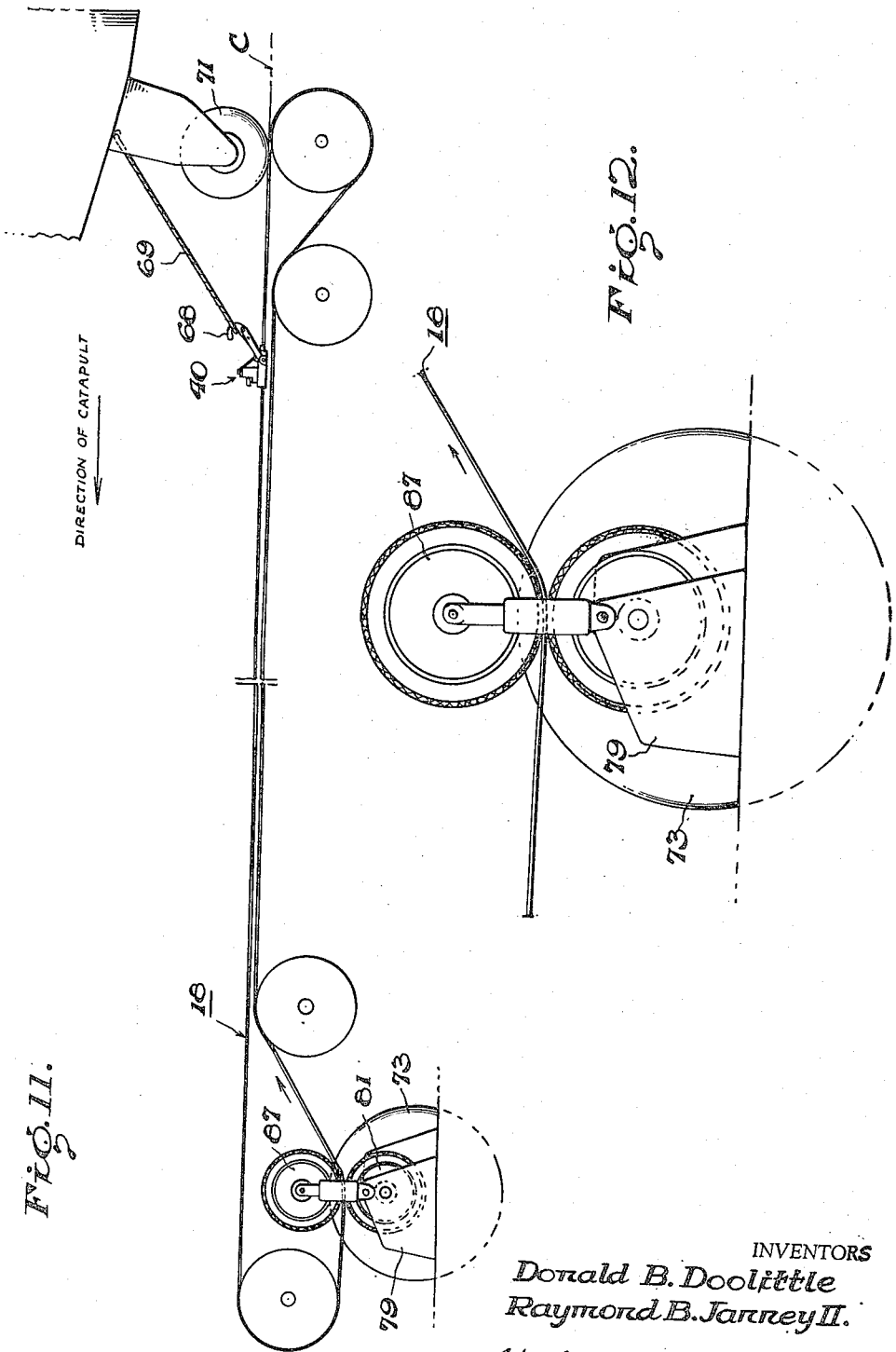

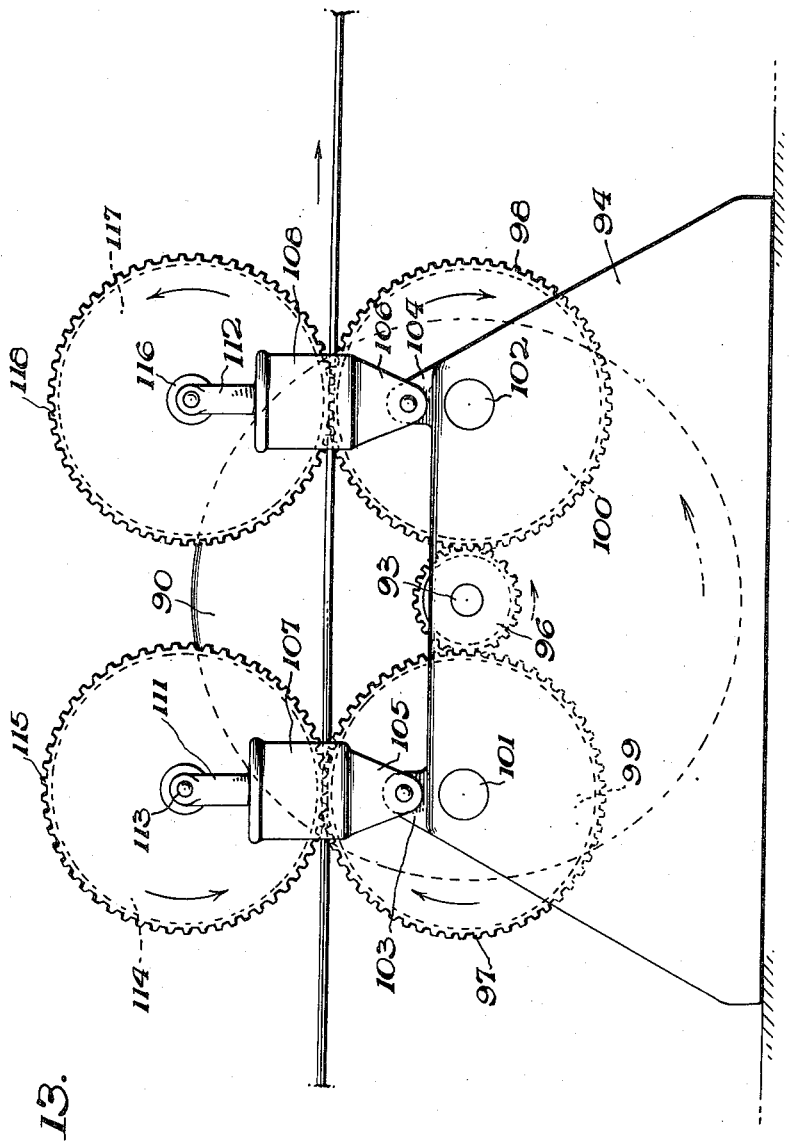

March 16, 1954  D. B. DOOLITTLE ET AL  2,672,306
FLYWHEEL TYPE CATAPULT LAUNCHING MEANS
Filed Jan. 5, 1951

INVENTORS
Donald B. Doolittle
Raymond B. Janney II.

BY *Herbert M. Birch*

ATTORNEY

March 16, 1954 D. B. DOOLITTLE ET AL 2,672,306
FLYWHEEL TYPE CATAPULT LAUNCHING MEANS
Filed Jan. 5, 1951 9 Sheets-Sheet 9
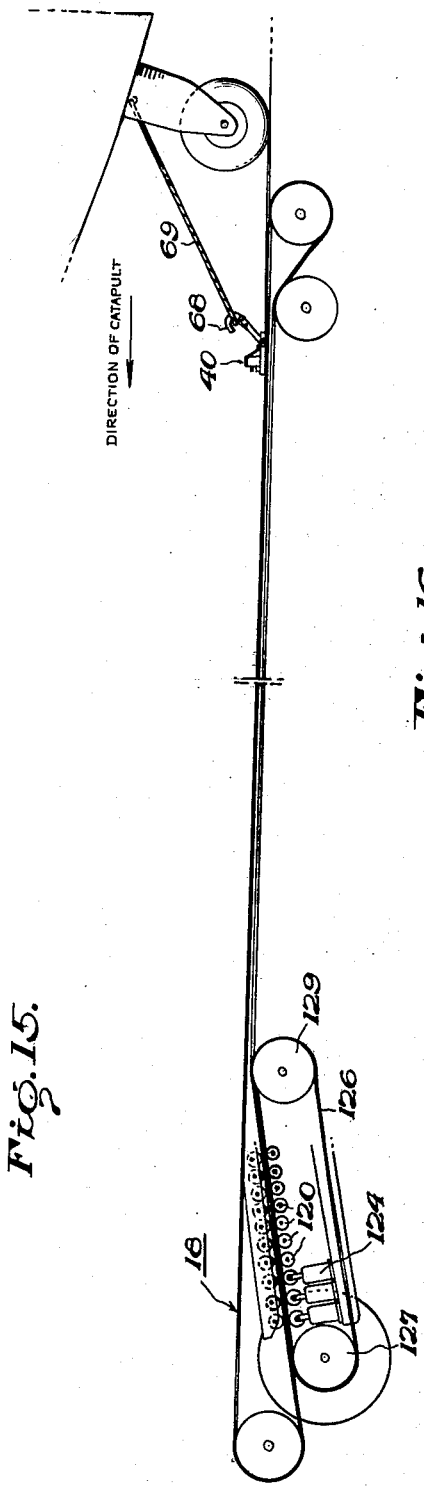
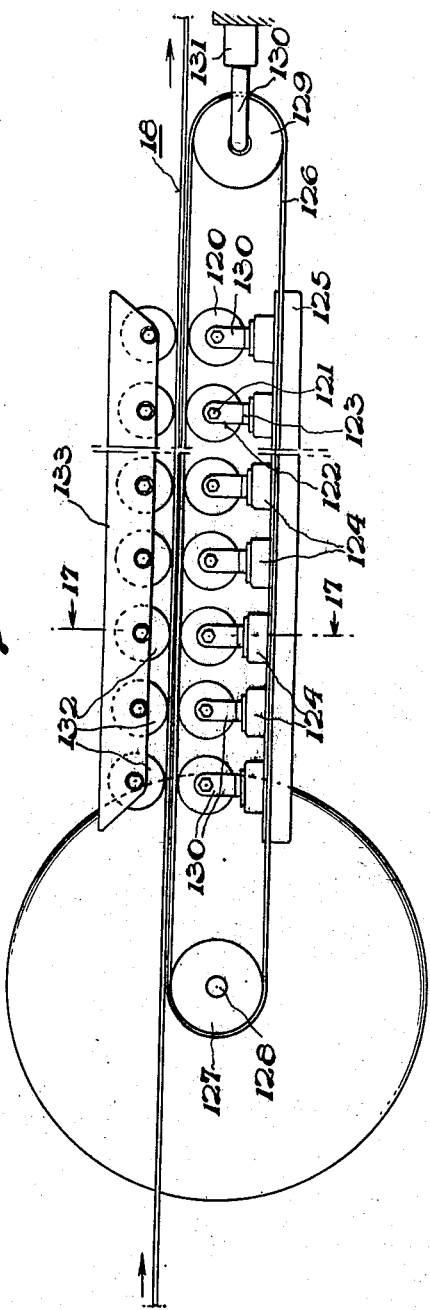
INVENTORS
Donald B. Doolittle
Raymond B. Janney II.
BY Herbert M. Birch
ATTORNEY Patented Mar. 16, 1954

2,672,306

UNITED STATES PATENT OFFICE 2,672,306

FLYWHEEL TYPE CATAPULT LAUNCHING MEANS

Donald B. Doolittle and Raymond B. Janney II, Wilmington, Del., assignors, by mesne assignments, to All American Engineering Company, Wilmington, Del., a corporation of Delaware Application January 5, 1951, Serial No. 204,548

9 Claims. (Cl. 244—63)

The present invention relates to the launching of aircraft and more particularly to a novel flywheel type catapult launching means.

Heretofore flywheel catapult launching systems usually have involved heavy and complex structures including accumulators, heavy cylinders, valves, cables, clutches and the like. The prior art systems are clumsy, expensive and because of the complexity of these systems are difficult to service.

The object of the present invention is to provide an efficient durable and simplified flywheel type catapult, which eliminates heavy and complex structures such as referred to above.

Another object is to replace most of the usual complex elements of prior art catapult launchers by using a power driven metal launching ribbon or tape, which transfers stored energy from the flywheel to catapult the aircraft.

Another object is to provide novel means for transferring the stored energy of the flywheel and the driven ribbon connected with the flywheel shaft, to automatically controlled means for connecting the aircraft with the launching ribbon.

A more specific object is to provide a novel traveling shuttle member including an aircraft bridle, which shuttle member serves to couple the catapult ribbon to the aircraft by the bridle for launching.

Another specific object is to provide pilot control means for automatically causing the coupling between the shuttle member and the catapult ribbon.

Other objects and advantages will become apparent from the following description when considered in conjunction with the accompanying drawings wherein three embodiments of the invention are illustrated. It is to be expressly understood that the drawings are for the purpose of illustration only and are not to be considered as any specific limitation of the invention.

In the drawings, wherein like reference numerals represent like parts in the several views:

Figure 1 is a diagrammatic side view of the launching tape or ribbon, the flywheel and power take-off for driving the ribbon and shows an aircraft to be launched coupled to the launching shuttle.

Figure 2 is an enlarged view of the terminal end of the launching mechanism and flywheel take-off driving connection with the launching ribbon.

Figure 3 is a top plan view of the power source for driving the flywheel and of the lower drive means of the flywheel power take-off for driving the launching ribbon.

Figure 4 is a detail of the ribbon sheaves and their supporting means with the retaining roller to keep the ribbon from jumping the sheave at high speeds.

Figure 5 is a side view partly in cross section of the launching shuttle, particularly the brakes for gripping the ribbon and partly in side elevation of the automatic brake actuating means.

Figure 6 is a top plan view in elevation of the launching shuttle and the guide means therefor.

Figure 7 is a cross section view taken on section line 7—7 of Figure 5.

Figure 8 is a diagrammatic illustration of a control panel with sets of controls and indicating means thereon.

Figure 9 is an enlarged cross section view of the flywheel mountings and of the ribbon main drive sheave.

Figure 10 is a side elevation view of one embodiment of the flywheel drive and the power take-off for driving the launching ribbon.

Figure 11 is a diagrammatic side view of a suitable support for mounting the lower launching ribbon drive wheel and the yieldable members for holding and forcing the upper drive wheel toward the lower wheel to thereby grip the launching ribbon.

Figure 12 is an enlarged view of the flywheel and ribbon drive wheels of Figure 11.

Figure 13 is another embodiment of means for driving the launching ribbon.

Figure 15 is a third embodiment of the launching ribbon drive or actuator showing an endless laminated belt with rollers held in contact with the ribbon by pressure cylinders.

Figure 16 is a side view in elevation of the lower reach of the launching ribbon and a tensioning means for the ribbon actuator belt shown diagrammatically in Figure 15.

Figure 14:
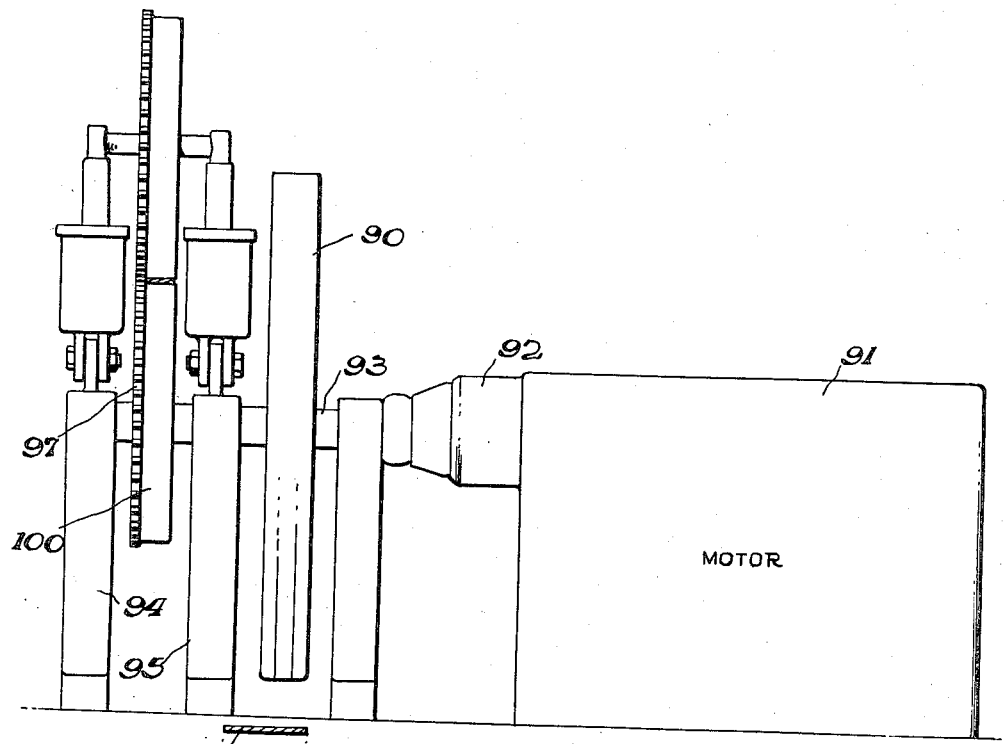
Figure 14 illustrates a power source and flywheel connecting arrangement for the embodiment illustrated in Figure 13.

Referring in detail to the drawings and first with particular reference to Figures 1 and 7 there is shown a power driven launching ribbon or tape 18. The ribbon is preferably made of metal and is looped around sheaves 19 and 20 in endless chain fashion to provide upper and lower reaches A and B, respectively. The lower reach B of the ribbon passes between actuating rollers 21 and 22. Roller 21 is mounted on a power shaft 23 with a flywheel 24 and the rollers 21 and 22 are pressed together by suitable means such as the hydraulic cylinders 25 and 26 to provide a power take-off from the flywheel 24 to drive the steel ribbon 18 in the direction indicated by the arrows in Figure 1.

The steel ribbon also passes over idler sheaves 27 and 28 adjacent each end of the lower reach B to take up any undesirable slack of the ribbon. Also, as shown in Figure 4 there are provided auxiliary ribbon retaining rollers 27' for each idler sheave.

The length of travel of the ribbon 18 may be determined by the type of aircraft to be launched, the power generated and the amount of energy stored and dispersed by the flywheel 24. The power unit is shown in more detail in Figure 3, wherein there is an engine 29 of suitable horsepower for driving the shaft 23 on which, as stated supra, is mounted the flywheel 24 and the lower roller 21 of the launching ribbon actuating mechanism. It is of course to be understood that the drive shaft 23 is journalled to rotate in standards or hangars 30, such as shown in Figure 3 and Figure 9. These standards with the flywheel and the engine 29 are countersunk below the level of any suitable base surface C, see Figures 7 and 10. On this base surface C are mounted side structures comprising elongated beams 31 and 32 arranged in spaced apart substantially parallel relation. Each beam is formed with an upper and lower flange 33 and 34 and the lower flange 34 of each beam is anchored to the surface C by means such as the nuts 35 and bolts 36, while the upper flange 33 of each beam supports a guide rail. For example, beam 31 supports the guide rail 37 and beam 32 the guide rail 38. Each rail is suitably secured to the flange of its respective beam by fasteners 39.

The upper and lower reaches A and B of the launching ribbon 18 travel between the elongated beams 31 and 32 as the energy stored by the flywheel 24 is released to drive the same. Straddling the upper reach A of the launching ribbon 18 is a launching shuttle 40 comprising a housing formed with side grooves 41 and 42 in which grooves fit the opposed edges of guide rails 37 and 38. Normally the shuttle 40 is freely slidable along the guide rails independently of the launching ribbon 18, but there are means to couple the shuttle to the launching ribbon, such as fluid actuated plates or brake shoes 43 and 44, one on each side of the ribbon.

In Figures 5 and 6 the shuttle 40 is shown in more detail and includes a plurality of upper and lower brake shoes 43 and 44 in the housing which is divided into separate brake chambers by partitions formed with interconnected fluid ducts. Brake shoes 43 are movable, while shoes 44 are fixed and form the bottom walls of the housing. The housing contains brake fluid above movable shoes 43 and the top part of the housing communicates with the end of a cylinder 46 through openings 48 and 48'. In the cylinder 46 is a piston rod 47, a piston 49 and a coiled spring 50. One end of the spring 49 abuts the head of the piston and the opposite end abuts the reduced end 51 of a threaded plug 52. The plug 52 threads in a threaded bore formed in the end of the cylinder and is held to various adjusted positions by a lock nut 53. The adjustment of the plug controls the tension forces of the spring 50, which is sufficiently strong when released or fired to force fluid from the cylinder through the openings 48 and 48' into the top of the beam housing to apply the brake 43. The application of the brakes 43 to the travelling launching ribbon 18 couples the shuttle 40 thereto.

Remote control means for releasing the spring is mounted on a control panel 55, see Figure 8. The panel 55 includes an off and on toggle firing switch 56 for closing an electric circuit to a solenoid 57 supported by a bracket 58. The solenoid includes a core plunger 59 formed with a latch end 60 and an opening for a manually releasable safety pin 60' connected by an electric cable 63 to light means 63$^a$ and 63$^b$ on the panel 55. The latch end 60 of the plunger normally is biased by a spring, not shown, into locking engagement with a detent 61 in the surface of a bumper bolt 62 formed from the end of the piston rod 47 of the piston 49.

The lights 63$^a$ and 63$^b$ on the panel, marked "Safe" and "Armed," indicate whether the plunger, 62, is locked mechanically by the safety pin, 60'. The purpose of the pin, 60', is to insure that even though someone might accidentally push the firing switch, 56, the catapult will not be actuated. The lights are actuated by an automatic switch not shown when pin is in or out of place. Switch, 56, energizes the solenoid, 59, which loads the brakes 43, and thus catapults the airplane. The switch 64, energizes a circuit not shown to the hydraulic cylinders of the flywheel power take-offs, to thereby determine whether or not the ribbon is engaged or disengaged to the flywheel drive.

The piston rod 47 is reciprocated from the end of the cylinder 46 through a stuffing box or packing 64 and the end of the bumper bolt projects forward of the front end of the shuttle 40. When the plunger 59 is released from detent 61 by the actuation of the firing switch 56 after release of the firing pin 60' and energization of the solenoid, the spring 50 forces the bumper bolt forward with the piston 49 and rod 47. As the piston 49 comes forward the fluid in the cylinder is forced into the upper part of the brake housing and the upper reach A of the launching ribbon 18 is gripped by the several brake shoes 43 and 44. Also lever 64 on panel 55 is turned to indicate that the ribbon is engaged. This causes the shuttle to travel forward along the guide rails 37 and 38 to the end of the launching track where the end of the bumper bolt strikes a bumper block 65, see Figs. 1 and 2 and retracts the same to again latch the plunger 59 in the detent 61 and a new firing pin 60' is inserted to hold the parts secure. Then, as shown in Figure 1, there is a retrieving unit 66 connected to the tail end of the shuttle 40, which retriever is rewound to return the shuttle to launching position. Such a device 66 is shown and described in U. S. Patents Nos. 2,483,655, issued October 4, 1940 to Arthur P. Shultz and No. 2,401,997, issued March 28, 1950, to Donald R. Doolittle.

The shuttle 40 includes a rearwardly upwardly extending bridle or yoke 67 with a tow hook 68. The hook 68 connects with a bridle cable 69, which connects or is fastened to the front of an aircraft 70 which straddles the beams 31 and 32 with its landing wheels 71 resting on the surface C, below which the flywheel is mounted so as to have the ribbon and shuttle only slightly above the surface to permit the aircraft undercarriage to straddle the guide rails.

In all forms of the present invention the launching ribbon, the shuttle and the ribbon sheaves are the same. However, in Figure 10 there is shown another specific embodiment of flywheel drive and power take-off for driving the ribbon 18. There is shown the launching surface C with a motor 72 and a flywheel 73 countersunk therein. A power transmission 74 connects the motor to the flywheel shaft 75. The shaft 75 extends through the hub of the flywheel and has keyed to the end a gear 76. The gear 76 meshes with a gear 77 keyed to an axle 78 journalled to revolve in bearings of spaced apart standards 79 and 80. A launching ribbon drive wheel 81 is keyed to rotate with the axle 78 and connected to the top of each one of the standards 79 and 80 is a hydraulic cylinder, namely, cylinders 82 and 83, respectively. Projecting upwardly from each cylinder are piston rods 84 and 85 formed at their respective ends with an opening and bearing to journal the ends of an axle 86.

The axle 86 has keyed thereto an idler wheel 87, which is pulled with considerable force into pressing engagement with the ribbon 18 resting on the first or lower drive or power take-off wheel 81. Each wheel 81 and 87 is covered with a compressible material such as rubber to provide a friction grip and drive for the ribbon passing therebetween. For example, the flywheel drive and power take-off wheels are shown in use with the launching ribbon 18 in Figures 11 and 12. The side beams 31 and 32 and guide rails 37 and 38 of Fig. 7 for the shuttle 40, not being shown in these figures to simplify the drawings.

A third form of launching ribbon actuator or power take-off is illustrated in Figures 13 and 14. This form comprises a flywheel 90, motor 91, a suitable automatic transmission 92 and a flywheel drive shaft 93 journalled to rotate in standards 94 and 95. The flywheel shaft 93 is centrally journalled in the standards as shown in Figure 13 and has keyed thereto between these standards a drive gear 96 rotatable in an anticlockwise direction. The gear 96 meshes with two relatively large ring gears 97 and 98 formed from wheels 99 and 100 keyed to be rotated in clockwise directions with their respective axles 101 and 102 journalled between and at each end of the standards 94 and 95.

The top corner edge of each standard 94 and 95 is formed with apertured lugs 103 and 104, respectively. Mounted over these lugs are the spaced apart apertured ears or bifurcated base connections 105 and 106 of laterally spaced pairs of actuator or pressure cylinders 107—107 and 108—108. The cylinders may be hydraulic and include pistons, not shown, connected to laterally spaced pairs of piston rods 111—111 and 112—112. The extended end of each piston rod 111—111 is employed to support a bearing to journal an axle 113 on which is keyed a wheel 114 and ring gear 115 complementary to wheel 99 and ring gear 97, while the extended end of each piston rod 112—112 is similarly enlarged at each end to support bearings to journal an axle 116 on which is keyed a wheel 117 and a ring gear 118 complementary to wheel 100 and ring gear 98.

The ring gears 115 and 118 are in mesh with the complementary ring gears 97 and 98, respectively, and the gears and rim surfaces of the wheels are held in pressed contact with each other by the actuator cylinders 107—107 and 108—108. Extending between the rim surface of the wheels is the launching ribbon 18, said ribbon being relatively thicker than the depth of the teeth of the ring gears 97—115 and 98—118, to thereby permit the rims of their respective oppositely mounted wheels to frictionally engage the said ribbon and as the wheels are rotated by the drive gear 96 on the flywheel shaft 93 they serve to drive the ribbon in the direction of the arrow shown in Fig. 13. Thus the shuttle 40 when the brake shoes are, as previously explained, actuated to grip the launching ribbon it will be carried forward to effect the launching of an airplane connected to the bridle 68 thereof. The rims of these ribbon drive wheels may be covered with anti-slip means to reduce slippage.

Figure 17:
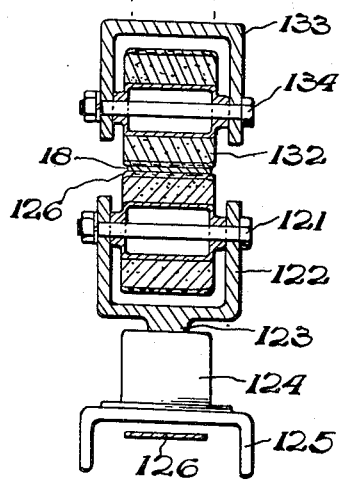
Figure 17 is a cross section view taken on the section line 17—17 of Figure 16.

A third form of launching ribbon actuator or power take-off is shown in Figures 15, 16 and 17 and comprises a plurality of aligned idler rollers 120 of Nylon, Neoprene or the like mounted on spindles 121 journalled in the bifurcated apertured ends 122 of piston rods 123 projected from fluid cylinders 124. The cylinders 124 are supported on the top of an angle iron 125, see Fig. 17, and an endless belt 126 is driven over these rollers 120 by a flywheel driven sheave 127. The sheave 127 is mounted on a flywheel shaft 128. The endless belt 126 loops at the opposite end around a sheave 129 mounted to revolve on the bridge of a U-shaped bracket 130 comprising part of a belt tensioning means 131.

Above the endless belt 126 are opposed idler rollers 132 journalled in an inverted angle iron support 133 on axle 134. Between the rollers 132 and the belt 126 extends the lower reach of the launching ribbon 18 and due to the pressure of the actuator cylinders 124 and belt 126 and rollers 132 provide a very efficient launching ribbon drive from the flywheel powered sheave 127.

OPERATION

The use and operation of the several embodiments is basically the same. For example, to launch an aircraft parked on the runway with its undercarriage straddling the catapult mechanism, the shuttle bridle is connected to the front of the aircraft. Next the engine for driving the flywheel and flywheel shaft is started, to thereby drive the launching ribbon 18 by any one of the take-off or actuating arrangements described. The ribbon is kept in motion to eliminate the necessity of accelerating the ribbon during the catapult operation. The ribbon passes through the disconnected catapult shuttle and between the brake shoes in the shuttle until the arming pin 60' is released. The airplane is now ready to be catapulted by energizing the solenoid 57, whereby the spring 51 is released to load the hydraulically or pneumatically actuated brake shoes or plungers 43. The thrust created by the braking load of the shuttle 18 on the ribbon 18 catapults the airplane.

As the bar 62 on the shuttle contacts the buffer at the end of the track, the brakes and catapult bridle are automatically disengaged and the shuttle can then be safe-tied and retrieved by the retriever 66 for the next catapult operation.

While only three specific embodiments of the invention are hereinbefore set forth, it is to be expressly understood that the invention is not to be limited to the exact construction illustrated and described because various modifications of these details may be provided in putting the invention into practice with the scope of the appended claims.

What is claimed is:

1. In an aircraft launching system having a power driven endless ribbon, a shuttle straddling said ribbon, longitudinally extending guide rails in spaced apart parallel relation on each side of the ribbon, said rails serving as guides for the shuttle, a bridle connected to said shuttle formed with a hook, a bridle cable having one end engageable with said hook and the other end secured to an aircraft to be launched, and brake means carried by the shuttle adapted to grip the ribbon to impart launching thrust to the aircraft, a bumper at the terminal end of the said shuttle guide rails, and means carried by the leading end of said shuttle positioned to strike the bumper and release the brake means after the aircraft is launched.

2. In an aircraft launching apparatus with a power driven ribbon, a power driven endless steel ribbon supported for rotation on a sheave at each end loop thereof, power take-off means for driving said ribbon, a shuttle straddling said ribbon, longitudinally extending guide rails in spaced apart parallel relation on each side of the ribbon, said rails serving as guides for the shuttle, a bridle connected to said shuttle formed with a hook, a bridle cable having one end engageable with said hook and the other end secured to an aircraft to be launched, and brake means carried by the shuttle adapted to grip the ribbon to impart launching thrust to the aircraft, a bumper at the terminal end of the said rails, means carried by the loading end of said shuttle positioned to strike the bumper and release the brake means, a detent formed in said last-named means, a spring loaded pin adapted to snap into said detent and lock said brakes in released position, and a remotely controlled solenoid for retracting said pin from the said detent.

3. In an aircraft launching system of the class described having an endless steel ribbon supported for travel on a sheave at each end loop thereof, a shuttle straddling said ribbon, grooves formed on each side of the shuttle longitudinally extending guide rails in spaced apart parallel relation on each side of the ribbon, the opposed edges of said rails serving as guides for the shuttle grooves, a supporting surface for said rails, a bridle yoke formed with a hook carried by said shuttle, a bridle cable having one end connected with said shuttle and the other end secured to an aircraft straddling the rails and parked on the supporting surface to be launched, brake means carried by the shuttle adapted to be actuated to grip the ribbon to impart launching thrust to the aircraft from the travel of said ribbon, and means at the terminal end of the said rails to release said brakes from the ribbon after launching an aircraft released from the bridle hook.

4. In a flywheel type catapult aircraft launching system, an endless steel ribbon supported for travel on a sheave at each end loop thereof, flywheel power-take-off means for driving said ribbon, a shuttle straddling said ribbon, said flywheel take-off means comprising a driven ribbon engaging roller, a second idler roller also engaging said ribbon on the side thereof opposite to said driven roller, and fluid presser means adapted to force said second roller against the surface of the ribbon thereby clamping it tightly against the driven roller.

5. In a flywheel type catapult aircraft launching system, an endless steel ribbon supported for travel on a sheave at each end loop thereof, flywheel power-take-off means for driving said ribbon, a shuttle driven by said ribbon, brake means carried by the shuttle adapted to be actuated to grip the ribbon to impart launching thrust to the aircraft from the said ribbon, as it is driven by said flywheel take-off means, said flywheel take-off means comprising a driven ribbon engaging member, a second idler member also engaging said ribbon on the side thereof opposite to said driven member, and fluid presser means adapted to force said second member against the surface of the ribbon thereby clamping it tightly against the driven member.

6. Launching means for aircraft comprising an aircraft launching surface, an elongated pair of guide rails spaced apart in parallel relation mounted on the said surface, a launching shuttle freely slidable along the rails, said shuttle including a housing containing fluid, a plurality of oppositely facing brake shoes mounted in the housing, an endless steel ribbon extending between the opposed brake shoes, said brake shoes normally being released from the surface of the ribbon, power means for causing said ribbon to travel between the brakes while they are released, whereby the shuttle is idle, an aircraft connecting bridle on the shuttle, fluid pressure means for applying said brakes to the travelling ribbon thereby coupling the shuttle thereto and moving the shuttle along the rails, to tow an aircraft coupled to its bridle, and brake release means at the aircraft launching end of the said rails.

7. Launching means for aircraft comprising an aircraft launching surface, an elongated pair of guide rails spaced apart in parallel relation mounted on the said surface, a launching shuttle freely slidable along the rails, said shuttle including a housing containing fluid, a plurality of oppositely facing brake shoes mounted in the housing, an endless steel ribbon extending between the opposed brake shoes, said brake shoes normally being released from the surface of the ribbon, power means for causing said ribbon to travel between the brakes while they are released, whereby the shuttle is idle, an aircraft connecting bridle on the shuttle, fluid pressure means for applying said brakes to the travelling ribbon thereby coupling the shuttle thereto and moving the shuttle along the rails to tow an aircraft coupled to its bridle, brake release means at the aircraft launching end of the said rails, flexible means connected to said shuttle normally coiled in a casing secured to the starting end of the said rails, said means uncoiling as the shuttle is picked up by the travelling ribbon and power means to recoil said flexible means thereby returning the shuttle after each aircraft launching operation.

8. In an aircraft launching system having a power driven endless steel ribbon supported for rotation on a sheave at each end loop thereof, a shuttle straddling said ribbon, longitudinally extending guide rails in spaced apart parallel relation on each side of the ribbon, said rails serving as guides for the shuttle, a bridle connected to said shuttle formed with a hook, a bridle cable having one end engageable with said hook and the other end secured to an aircraft to be launched, and brake means carried by the shuttle adapted to grip the ribbon to impart launching thrust to the aircraft, a bumper at the terminal end of the said rails, and means carried by the loading end of said shuttle positioned to strike the bumper and release the brake means, a detent formed in said last-named means, a spring loaded pin adapted to snap into said detent and lock said brakes in released position, a remotely controlled solenoid for retracting said pin from the said detent, and a second pin insertable transverse the said solenoid latch pin for locking said solenoid pin against movement whether said solenoid is energized or not, said pin when in or out of connection with the solenoid pin serving to complete circuits to a pair of lights mounted at a remote point marked "Safe" and "Armed," respectively.

9. Means for launching an airplane of the character described having a power driven belt, the upper reach thereof being spaced between a pair of longitudinally extending guide rails in spaced parallel relation on each side of the belt; a launching shuttle comprising a housing formed with side grooves, said grooves being in engagement with the edges of said guide rails, said housing being shaped to straddle the said upper reach of the belt, upper and lower brake shoes supported within the housing, the lower shoe being adjacent the under side of the upper belt reach and the upper shoe being adjacent the top side of the said upper belt reach, a yoke connected to the shuttle housing formed with an aircraft bridle hook, and fluid brake applying means adapted to move said shoes into engagement with each side of the upper reach of the belt.

DONALD B. DOOLITTLE.
RAYMOND B. JANNEY II.

References Cited in the file of this patent

UNITED STATES PATENTS

| Number | Name | Date |
|---|---|---|
| 371,599 | Lane | Oct. 18, 1887 |
| 1,620,785 | Roan | Mar. 15, 1927 |
| 1,892,357 | Moe | Dec. 27, 1932 |
| 2,217,946 | Dondero | Oct. 15, 1940 |
| 2,240,947 | Wilson | May 6, 1941 |
| 2,375,449 | Unger et al. | May 8, 1945 |
| 2,483,655 | Schultz | Oct. 4, 1949 |

FOREIGN PATENTS

| Number | Country | Date |
|---|---|---|
| 817,237 | France | May 6, 1936 |